United States Patent [19]

Arndt

[11] 4,401,193
[45] Aug. 30, 1983

[54] APPARATUS FOR LOCKING A DRIVE SHAFT FOR THE ELEVATION OR AZIMUTH SIGHTING MOVEMENTS OF THE SIGHTING DEVICE OF AN OBSERVATION PERISCOPE

[75] Inventor: Klaus Arndt, Zurich, Switzerland

[73] Assignee: Contraves AG, Zürich, Switzerland

[21] Appl. No.: 253,653

[22] Filed: Apr. 13, 1981

[30] Foreign Application Priority Data

Apr. 30, 1980 [CH] Switzerland ............... 3335/80

[51] Int. Cl.³ ............................................. F16D 65/30
[52] U.S. Cl. ........................................ 188/69; 74/527
[58] Field of Search ................... 74/527, 528, 530; 188/67, 69, 70 R, 196 M, 265

[56] References Cited

U.S. PATENT DOCUMENTS

| | | | |
|---|---|---|---|
| 1,484,875 | 2/1924 | Clas | 74/528 |
| 1,898,569 | 2/1933 | Pearson | 74/528 X |
| 2,353,891 | 7/1944 | Gruntorad | 188/67 X |
| 2,407,696 | 9/1946 | Webster | 74/527 |
| 2,627,945 | 2/1953 | Hooker | 74/527 X |

FOREIGN PATENT DOCUMENTS

| | | |
|---|---|---|
| 1268934 | 5/1968 | Fed. Rep. of Germany . |
| 1948046 | 4/1971 | Fed. Rep. of Germany . |
| 1578279 | 12/1971 | Fed. Rep. of Germany . |
| 2096311 | 2/1972 | France . |
| 2420405 | 10/1979 | France . |

Primary Examiner—Duane A. Reger
Attorney, Agent, or Firm—Werner W Kleeman

[57] ABSTRACT

An apparatus for the locking of a component or part free of play, especially a drive shaft in a null position, but also other elements, such as a machine part. The drive shaft can be rotated about its lengthwise axis and positioned in a predetermined rotational position. In the null position the drive shaft provided with an impact or contact element is locked by means of a first locking element constructed as a hard layer and a second locking element constructed as a resilient contact or impact member, each of which locking elements are rotatable into the rotational plane of the drive shaft. The drive shaft is locked by the locking elements in such a manner that the first locking element and the contact or impact element attached to the drive shaft as well as the second displaceably mounted locking element are successively acted upon or contacted by the action of the restoring force of a spring which is effective at the second locking element. The locking apparatus renders possible, particularly for adjusting the optical axes, an axactly reproducible essentially play-free locking of the drive shaft provided, for instance, for the azimuth or elevational movement of a sighting or aiming device of an observation periscope arranged above a armoured vehicle roof or cover arrangement of a combat vehicle or the like.

7 Claims, 5 Drawing Figures

APPARATUS FOR LOCKING A DRIVE SHAFT FOR THE ELEVATION OR AZIMUTH SIGHTING MOVEMENTS OF THE SIGHTING DEVICE OF AN OBSERVATION PERISCOPE

BACKGROUND OF THE INVENTION

The present invention relates to a new and improved construction of apparatus for locking essentially free of play a component or part which can be oriented in a defined position, especially a drive shaft rotatably mounted in a housing. The drive shaft is provided, for instance, for the elevation or azimuth movement of a sighting or aiming device or the like of an observation periscope and can be positioned in predetermined rotational positions.

For the purpose of arresting the elevational movement of a reflector or mirror in a periscope there is known to the art from German Pat. No. 2,030,735 an apparatus wherein a component which performs the elevational movement can be rotated by means of a shaft which can be locked in a desired terminal or end position in order to determine the line of sight. The locking action is essentially accomplished by two locking elements arranged in spaced relationship from one another and rigidly connected for rotation with the shaft as well as by two further locking elements attached at a component or part arranged in spaced relationship from the shaft. These two further locking elements can be moved to-and-fro by a magnet and in the locking position are form-lockingly and force-lockingly connected with both of the first locking elements. This apparatus is afflicted with the drawback that in the presence of even the slightest amount of wear the inter-engaging locking elements no longer ensure for the accuracy required for such type of optical equipment.

Other exemplary constructions of prior art equipment have been disclosed, for instance, in French Pat. Nos. 2,096,311 and 2,420,405 and German Patent Publication No. 1,948,046 and German Pat. Nos. 1,578,279 and 1,268,934.

SUMMARY OF THE INVENTION

Therefore, with the foregoing in mind it is a primary object of the present invention to provide a new and improved construction of locking apparatus for a drive shaft for the elevation or azimuth movement of a sighting or aiming device of an observation periscope and which is not associated with the aforementioned drawbacks and limitations of the prior art constructions.

Another and more specific object of the present invention aims at providing a new and improved construction of apparatus for the locking of components or parts relatively free of play, especially for the locking of a drive shaft provided with an optical system for the elevation or azimuth movements of a sighting device of an observation periscope, wherein the aforementioned disadvantageous wear at the locking elements can be extensively avoided or compensated, as the case may be, and which for the purpose of adjusting the optical axes ensures for an exactly reproducible null position.

A still further significant object of the present invention aims at providing a new and improved construction of locking apparatus for a movable part or component, which locking apparatus is relatively simple in construction and design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the locking apparatus of the present development contemplates that the drive shaft can be locked in a predetermined rotational position by means of a first pivotable locking element constructed as a hard layer and a second pivotable locking element constructed as a resilient contact or impact member. Each of the locking elements can be pivoted out of a rest position into the rotational plane of the drive shaft. The first locking element, a contact or impact element secured to the drive shaft and directed radially outwardly and the second displaceably mounted locking element are acted upon or contacted in succession by the restoring force of a compression or pressure spring which is effective at the second locking element.

Notable advantages of the invention worthy of highlighting at this point reside in the fact that the drive shaft is pressed free of play against the hard layer in the predetermined null position by the constant contact or biasing force of the spring. Tests have shown that without resorting to any particular measures there can be obtained an angle reproducibility of less than 0.1 m rad.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
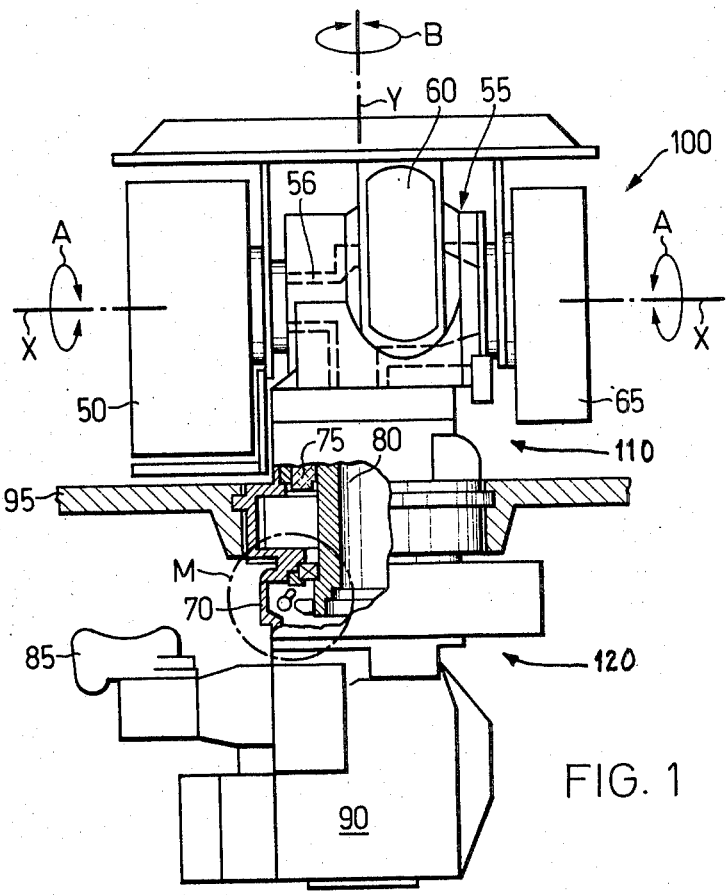
FIG. 1 shows schematically and partially in sectional view an observation periscope equipped with a sighting or aiming device pivotable about an elevation-tilt axis and about an azimuth-rotational axis.

Describing now the drawings, in FIG. 1 there is shown in schematic and partially sectional view an observation or spotting periscope 100 composed of a sighting or aiming device, generally represented by reference character 110, which is arranged above a cover or roof 95, for instance an armoured roof of an armoured combat vehicle, and a support or carrier unit, generally indicated by reference character 120 which is arranged below the roof or cover 95. The sighting device 110 essentially comprises a first housing 55 which preferably possesses an integrated objective device 60. This objective device or unit 60 can be pivoted in the direction of the double-headed arrow A about the horizontal elevation-tilt axis X—X by means of a drive shaft 56 which can be actuated by any suitable and therefore not particularly illustrated drive unit or drive means. According to a preferred exemplary embodiment of the observation periscope 100, there is arranged at one side of the housing 55 an optical receiver 50 and at the opposite side of the housing 55 a suitable distance measuring device 65 and these components along with the objective device 60 can be conjointly pivoted about the tilt axis X—X in the direction of the double-headed arrow A.

The support unit or device 120 located below the armoured vehicle roof 95 essentially encompasses a second housing 70, a drive shaft 80 rotatably mounted in the housing 70 and operatively connected with the sighting device 110, a schematically illustrated occular device 85 and a signal fading-in device 90. A drive unit or drive means 75 arranged in the housing 70 and operatively connected with the shaft 80 essentially accomplishes the rotational movement of the sighting device 110 arranged above the vehicle roof or cover 95 about the vertical azimuth-rotational axis Y in the direction of the double-headed arrow B.

Figure 2:
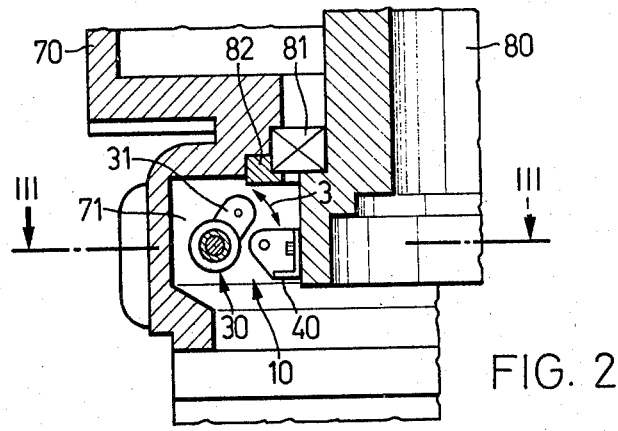
FIG. 2 is a fragmentary sectional view, on an enlarged scale, of the region of the arrangement of FIG. 1 enclosed within a circle labelled by reference character M, illustrating the locking apparatus or device for locking the drive shaft for the azimuth-rotational axis.

For the purpose of aligning the elevation-tilt axis X—X or the azimuth-rotational axis Y the corresponding drive shaft 56 or 80 is positioned at a predetermined angle in an exact and accurately reproducible null position in which the shaft 80 can be locked with the housing 70 or the shaft 56 with the housing 55. FIG. 2 illustrates on an enlarged scale the portion of the structure shown in FIG. 1 and enclosed within a circle labelled by reference character M and constituting an appropriately constructed locking apparatus or locking means 10 for locking, for instance, the shaft 80 with the housing 70. In particular, there will be recognised details of the housing 70, a suitable antifriction bearing or the like, such as a roller bearing 81 retained by a ring member 82, the shaft 80 and the locking apparatus 10 for locking of such shaft 80. This locking apparatus 10 has been shown in FIG. 2 in its unlocked condition and arranged in a suitable space or pocket 71 provided in the housing 70.

Figure 3:
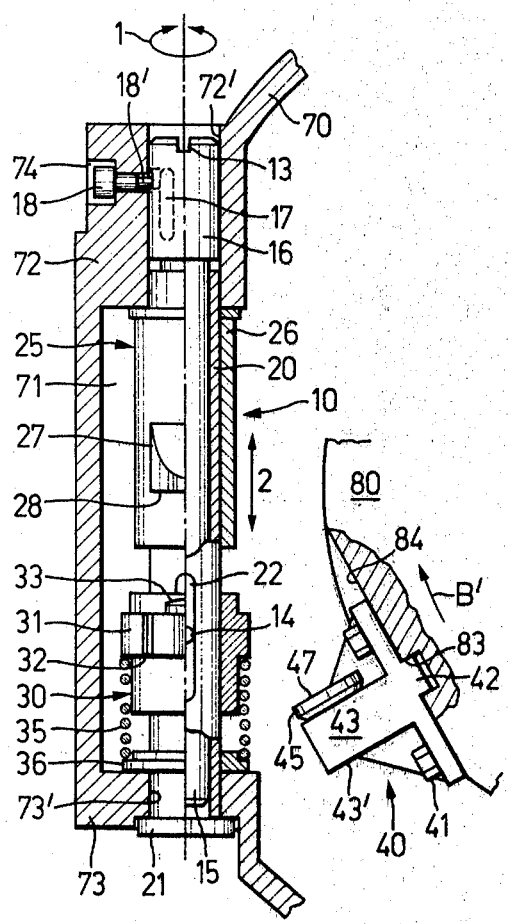
FIG. 3 illustrates the locking device or apparatus shown in FIG. 2 on an enlarged scale and in sectional view taken substantially along the line III—III thereof and in its unlocked condition.

FIG. 3 shows on an enlarged scale and partially in sectional view, taken substantially along the section line III—III of FIG. 2, the locking apparatus 10 in its unlocked condition and which is arranged in the aforementioned space or chamber pocket 71 of the housing 70. Between two mutually spaced walls 72 and 73 of the housing 70 which are provided with bores 72' and 73', respectively, there is mounted a bushing or sleeve 20 or equivalent structure within such mutually corresponding bores 72' and 73'. This bushing or bushing member 20 is retained at one side or end by a disc or plate member 21 which is appropriately attached at the related wall 73. Mounted within the bushing 20 is a bolt or rod 15 or the like which is provided at one side or end with a headpiece or head portion 16 mounted in the related bore 72. This headpiece or head portion 16 possesses an angle or circumferential slot 17 extending in radial and axial direction, i.e. for instance a substantially T-shaped slot extending about part of the circumference and along part of the axial extent of the bolt or rod 15, as will be apparent from FIGS. 3 and 4. A threaded bolt member 18 or equivalent structure arranged and secured in a recess 74 of the wall 72 engages by means of a bolt shaft or shank portion 18' in the angle slot 17. Th bolt or rod 15 is thus rotatable throughout a predetermined region, which is governed by the configuration of the angle or circumferential slot 17, about the lengthwise axis of the bolt or rod 15 in the direction of the double-headed arrow 1 and can be axially shifted in the direction of the double-headed arrow 2. The bushing 20 additionally serves for receiving and mounting two locking elements 25 and 30 arranged in spaced relationship from one another, as will be described more fully hereinafter.

The first locking element 25 which bears at the housing wall 72 and which is constructed as a sleeve member or sleeve 26 or equivalent structure is provided with a laterally arranged, radially outwardly directed impact or contact member 27 and is operatively connected by any suitable fixation means in axial and radial direction with the bushing or bushing member 20. The second locking element 30, likewise constructed as a sleeve, possesses a laterally outwardly directed locking or arresting member 31 and is operatively connected by means of a pin or plug member 14 or the like with the bolt or rod 15 as well as with the bushing 20. This attachment pin 14 or equivalent structure is secured in any suitable fashion in the bolt or rod 15, piercingly penetrates through the bushing 20 and is guided in an axially extending longitudinal slot 22. Viewed in radial direction there is arranged at the outer region of the locking member 31 a bolt member or protuberance 33 provided with a preferably spherically-shaped or ball-like head portion or element 33' which is attached to the locking member 31 in any suitable fashion. The locking member 31 provided with a substantially ring-shaped or annular contact or impact edge 32 furthermore serves as a contact or abutment element for one end of a restoring or return spring 35 or equivalent structure which is supported at the opposite end preferably at a bushing 36 bearing at the housing wall 73.

Figure 5:
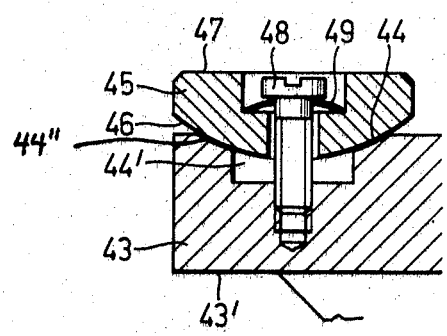
FIG. 5 is a fragmentary sectional view of a partial element or part of a contact or impact element attached at the drive shaft.

Furthermore, in FIG. 3 there is shown a portion of the drive shaft 80 which is rotatable about the azimuth-rotational axis Y in the direction of the arrow B'. This drive shaft 80 has been illustrated in a position where it has not yet been fully pivoted into the null and arresting position. Laterally at the shaft 80 provided with a contact or impact surface 84 there is arranged an impact or contact element 40. This contact or impact element 40 is guided by means of a guide portion or part 42 in a longitudinal groove 83 extending in axial direction of the shaft 80 and secured against rotation. The contact element 40 is attached at the shaft 80 by means of threaded bolts or screws 41 or equivalent fastening devices. The contact or impact element 40 possesses a web or ledge 43 at which there is arranged and secured a contact portion or part 45 at the side thereof confronting the first locking element 25. In FIG. 5 there has been shown on an enlarged scale and in sectional view the contact or impact portion 45 which is secured to the web 43 or equivalent structure by means of a threaded bolt or screw 48. Furthermore, there will be recognised that the contact or impact portion 45 is mounted in a correspondingly configured recess or depression 44 of the web 43 and also is provided with a substantially spherical-shaped or ball-like configured contact or impact surface 46. The depression or recess 44 possesses a substantially ring-shaped and spherical-shaped contact or seating surface 44" at which merges a substantially cylindrical recess or space 44'. The contact portion or part 45 is mounted in the recess or depression 44 and secured at the web 43 by means of the threaded bolt 48, which is subjected to a spring tension or bias by the action of a spring or resilient element, for instance a plate spring 49, in a manner such that there is possible a slight movement to all sides of the contact or impact portion 45 within the spherical seating surface 44".

Figure 4:
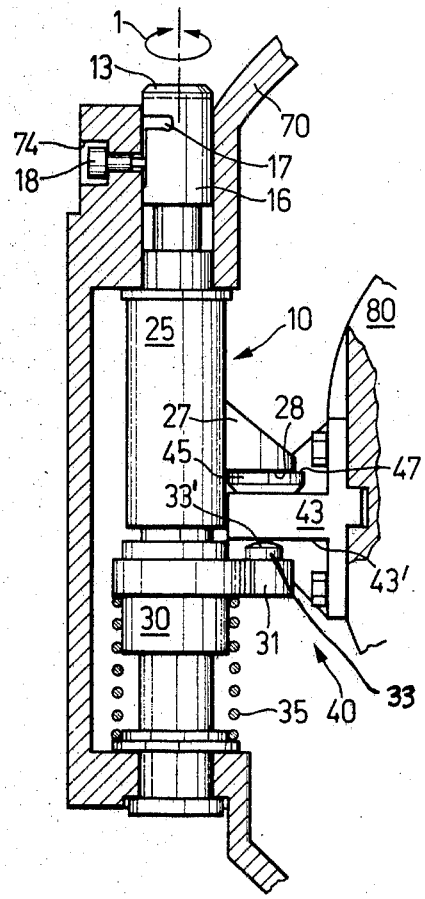
FIG. 4 illustrates the apparatus of FIG. 3 in front view with the drive shaft shown in its locked condition.

FIG. 4 illustrates the shaft 80 which here has been pivoted into the null and fixation or arresting position. There will be recognised the first locking element 25 which bears by means of the contact or impact surface 28 of the impact or contact member 27 at the contact surface 47 of the contact portion or member 45 which is attached at the contact or impact element 40. Furthermore, there will be recognised the second locking element 30 which bears by the action of the restoring spring 35 by means of the spherical-shaped head surfce or portion 33' of the bolt member 33 arranged at the front end of the locking member 31 against the contact or impact surface 43' of the web or ledge 43.

Having now had the benefit of the detailed description of the exemplary embodiment of locking apparatus its mode of operation will be considered and is as follows: The randomly selected null position of the shaft 80 rotatable about its lengthwise axis in the direction of the arrow B' is determined during assembly of the equipment and, for instance, is obtained by the use of any suitable means, such as typically by way of example and not limitation, terminal switches or the like. In order to lock the shaft 80 which has been pivoted into its null position the bolt or rod member 15 is rotated by means of a suitable tool, such as a screwdriver or the like, in the direction of the double-headed arrow 1, this screwdriver being introduced into rod slot 13. At the same time both of the locking elements 25 and 30 which are operatively connected with the bolt or rod 15 are rotated about the lengthwise axis of such bolt. In the position illustrated in FIG. 4, owing to the action of the restoring force of the spring 35, the locking or arresting member 31 of the locking element 30 along with the bolt member 33 is pressed against the contact or impact surface 43' of the contact or impact element 40 attached at the shaft 80 and the contact portion 45 mounted at the contact or impact element 40 is pressed against the surface 28 of the contact or impact member 27 and which is provided as a hard layer. The contact portion or part 45 mounted in the recess 44 is correspondingly accommodated to the impact surface 28 of the contact or impact element 27. For the purpose of unlocking the shaft 80, by depressing and rotating the bolt or rod 15 the locking member 31 as well as the impact member or element 27 are rotated out of the rotational plane of the shaft 80. In the unlocked condition the bolt or rod 15 is secured by the threaded bolt or screw 18 which engages into the angle slot 17. Due to the combination of the hard layer-impact member with the resilient impact member there is ensured a null position which is free of play and exactly reproducible.

In conjunction with FIGS. 3 and 4 there has been illustrated and described in detail as an exemplary embodiment the locking apparatus 10 for locking the shaft of an optical device or instrument, wherein such shaft is rotatable about its lengthwise axis. For instance, the shaft may be constituted by the drive shaft of the elevation-tilt axis or the drive shaft of the azimuth-rotational axis of a periscope. However, it is here specifically mentioned that the afore-mentioned locking apparatus also can be beneficially employed for the locking of other types of parts free of play and with an exact or accurate reproducibility, such as a machine part of component movable along a substantially straight line and positioned or positionable in a null position.

While there are shown and described present preferred embodiments of the invention, it is to be distinctly understood that the invention is not limited thereto, but may be otherwise variously embodied and practiced within the scope of the following claims. Accordingly,

What I claim is:

1. An apparatus for locking essentially free of play a component which can be positioned in a defined position, especially for locking a drive shaft rotatably mounted in a housing and intended for the elevation or azimuth movements of a sighting device of an observation periscope and positionable in a predetermined rotational position, comprising:
   a drive shaft rotatable in a predetermined plane of rotation;
   a first pivotable locking element and a second pivotable locking element for locking said drive shaft in said predetermined rotational position;
   said first locking element being structured to define a hard layer and said second locking element being structured as resilient impact means;
   each of said first and second locking elements being pivotable out of a rest position into the rotational plane of the drive shaft;
   a radially outwardly directed impact element attached to said drive shaft;
   a compression spring exerting a restoring force upon said second locking element; and
   said first locking element, said radially outwardly directed impact element and said second locking element being acted upon in succession by the restoring force of said compression spring, in order to lock said drive shaft in a defined position essentially free of play.

2. The apparatus as defined in claim 1, wherein:
   said second locking element defines a displaceably mounted locking element.

3. An apparatus for locking essentially free of play a component which can be positioned in a defined position, especially for locking a drive shaft rotatably mounted in a housing and intended for the elevation or azimuth movements of a sighting device of an observation periscope and positionable in a predetermined rotational position, comprising:
   a drive shaft rotatable in a predetermined plane of rotation;
   a first pivotable locking element and a second pivotable locking element for locking said drive shaft in said predetermined rotational position;
   said first locking element being structured to define a hard layer and said second locking element being structured as resilient impact means;
   each of said first and second locking elements being pivotable out of a rest position into the rotational plane of the drive shaft;
   a radially outwardly directed impact element attached to said drive shaft;
   a compression spring exerting a restoring force upon said second locking element;
   said first locking element, said radially outwardly directed impact element and said second locking element being acted upon in succession by the restoring force of said compression spring;
   means for pivotably mounting both of said locking elements;
   said pivotably mounting means comprising:
   a bushing;

a housing in which there is mounted said shaft;

said housing having two walls arranged in spaced relationship from one another; and a bolt member guided in said bushing;

the first locking element being fixedly connected for rotation with said bushing;

said second locking element together with said bolt member being guided in said bushing; and said second locking element together with said bolt member being axially displaceable in relation to said bushing and being fixedly connected for rotation with said bushing.

4. The apparatus as defined in claim 3, wherein:

said bolt member being provided at one end with a headpiece containing an angle slot extending in radial and axial direction of said bolt member in order to ensure for a limited radial and axial movement of parts which are operatively connected with said bolt member; and means attached at said housing and engaging into said angle slot.

5. The apparatus as defined in claim 4, wherein:

said engaging means comprises a threaded bolt having a shaft engaging with said angle slot.

6. The apparatus as defined in claim 1, further including:

a contact portion provided at said impact element at a side thereof confronting the first locking element constructed as a hard layer;

said first locking element having a contact surface; and said contact portion, upon locking of said shaft, coacting with said contact surface of said first locking element.

7. An apparatus for locking essentially free of play a component which can be positioned in a defined position, especially for locking a drive shaft rotatably mounted in a housing and intended for the elevation or azimuth movements of a sighting device of an observation periscope and positionable in a predetermined rotational position, comprising:

a drive shaft rotatable in a predetermined plane of rotation;

a first pivotable locking element and a second pivotable locking element for locking said drive shaft in said predetermined rotational position;

said first locking element being structured to define a hard layer and said second locking element being structured as resilient impact means;

each of said first and second locking elements being pivotable out of a rest position into the rotational plane of the drive shaft;

a radially outwardly directed impact element attached to said drive shaft;

a compression spring exerting a restoring force upon said second locking element;

said first locking element, said radially outwardly directed impact element and said second locking element being acted upon in succession by the restoring force of said compression spring;

a contact portion provided at said impact element at a side thereof confronting the first locking element constructed as a hard layer;

said first locking element having a contact surface;

said contact portion, upon locking of said shaft, coacting with said contact surface of said first locking element;

said contact portion being provided with a substantially spherical-shaped contact surface; and said impact element being provided with a recess means configured for movably mounting and securing the spherical-shaped contact surface of said contact portion.

* * * * *